United States Patent
Berstis et al.

(10) Patent No.: US 6,388,854 B1
(45) Date of Patent: May 14, 2002

(54) LOAD BALANCING AND DISTRIBUTING SWITCH-ON CONTROL FOR A CIRCUIT BREAKER, AN APPLIANCE, A DEVICE, OR AN APPARATUS

(75) Inventors: Viktors Berstis, Austin; Joel Leslie Smith, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,940

(22) Filed: Dec. 9, 1999

(51) Int. Cl.[7] .................................................. H02H 3/00
(52) U.S. Cl. ........................ 361/94; 307/141; 307/141.4
(58) Field of Search ........................... 361/62, 94, 93.2; 307/141, 141.4

(56) References Cited

U.S. PATENT DOCUMENTS

| | | | |
|---|---|---|---|
| 4,145,617 A | | 3/1979 | Lee et al. |
| 4,213,058 A | | 7/1980 | Townsend |
| 4,709,238 A | | 11/1987 | Green |
| 4,749,881 A | | 6/1988 | Uhrich |
| 4,769,555 A | * | 9/1988 | Pequet et al. ................ 307/141 |
| 4,853,884 A | | 8/1989 | Brown et al. |
| 5,450,334 A | * | 9/1995 | Pulizzi et al. ................ 700/295 |
| 5,459,358 A | | 10/1995 | Rose |
| 5,581,132 A | | 12/1996 | Chadwick |
| 5,621,277 A | * | 4/1997 | Ricca ........................... 315/86 |
| 5,644,463 A | * | 7/1997 | El-Sharkawi et al. ......... 361/94 |
| 5,687,139 A | | 11/1997 | Budney |
| 5,910,956 A | | 6/1999 | Guthrie et al. |
| 5,949,148 A | * | 9/1999 | Wagner ........................ 307/10.1 |
| 6,201,675 B1 | * | 3/2001 | Ballinger ...................... 361/63 |
| 6,212,049 B1 | * | 4/2001 | Spencer et al. ................ 361/64 |
| 6,222,714 B1 | * | 4/2001 | Hoffman ...................... 361/93.2 |
| 6,239,962 B1 | * | 5/2001 | Seymour et al. ............. 361/115 |

* cited by examiner

Primary Examiner—Michael J. Sherry
(74) Attorney, Agent, or Firm—Leslie A. Van Leeuwen; Bracewell & Patterson, L.L.P.

(57) ABSTRACT

The present invention is a load balancing and distributing switch-on/turn-on control for a circuit breaker, an appliance, a device, or an apparatus wherein each switch-on device on a circuit breaker, appliance, device, or apparatus generates and provides a turn-on time delay up to a maximum turn-on time delay so that the turn-on times and respective loads after a power failure from all circuit breakers, appliances, devices, and/or apparatuses are distributed and/or balanced over a turn-on period. The present invention distributes and balances the load and consumption by various appliances, devices, and apparatuses at the time of initial power up after a power failure. The present invention also distributes the turn-on times of the various appliances, devices, and apparatuses at the initial power up time. A circuit system and method for load balancing and distributing switch-on control of an operating device. A micro-controller is able to couple to the operating device and to a power-in bus for receiving power from a power source. A relay switch system is coupled to the micro-controller for controlling the power from the power-in bus. The relay switch system is able to couple to a power-out bus to control the power to the operating device. The micro-controller generates a power-up delay time through which the micro-controller must wait and control the relay switch system to hold the power to the power-out bus before the relay switch is released to supply the power to the power-out bus for operation of the operating device.

22 Claims, 3 Drawing Sheets

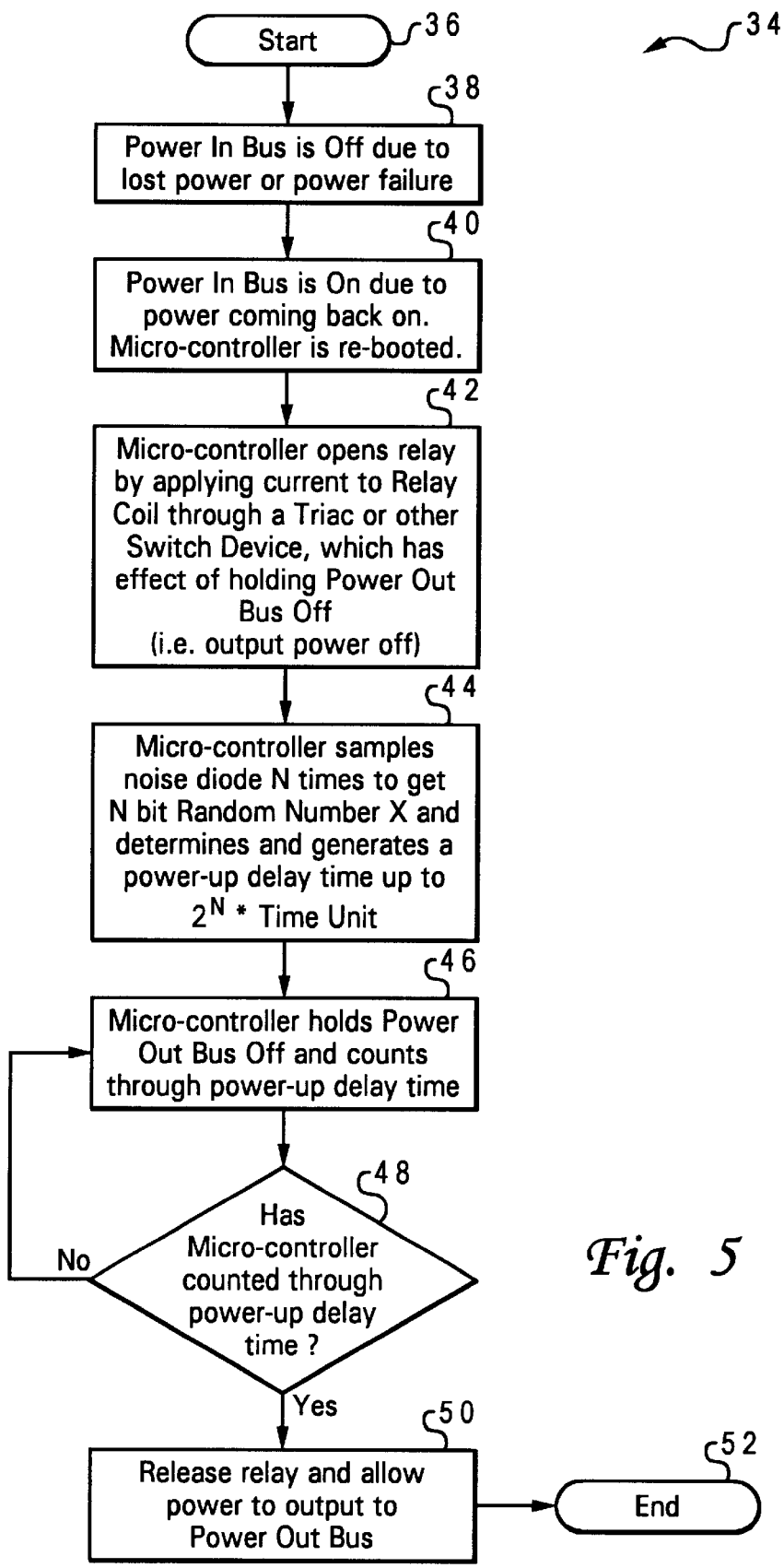

LOAD BALANCING AND DISTRIBUTING SWITCH-ON CONTROL FOR A CIRCUIT BREAKER, AN APPLIANCE, A DEVICE, OR AN APPARATUS

BACKGROUND OF THE INVENTION

1. Technical Field

The present invention relates in general to a switch-on control circuit system and method and, in particular, to a load balancing and distributing switch-on control for a circuit breaker, an appliance, a device, or an apparatus wherein each switch-on device on a circuit breaker, appliance, device, or apparatus generates and provides a turn-on time delay up to a maximum turn-on time delay so that the turn-on times and respective loads after a power failure from all circuit breakers, appliances, devices, and/or apparatuses are distributed and/or balanced over a turn-on period.

2. Description of the Related Art

When a power failure occurs, power to circuit breakers at residences and commercial buildings and to appliances, devices, or apparatuses is cut off and ceases to exist. These power consuming appliances, devices, and apparatuses all shut off during the power failure. At the time that the power failure is rectified and power is restored, all appliances, devices, apparatuses begin to turn back on and start consuming power. Thus, an extremely large load spike is created and generated during the time the various residences and commercial buildings are being restored with power wherein various appliances, devices, or apparatuses at the various residences and commercial buildings begin to again consume power.

One main problem when power is restored by a power company is that many appliances, devices, and apparatuses all begin to initiate and consume power at the same initial time. With reference now to the figures and in particular with reference to FIG. 1, a prior art power load and consumption diagram 10 is shown. FIG. 1 shows that an extremely large power load and consumption spike 12 is created at the time power is restored by the power company and at the time various appliances, devices, and apparatuses begin to consume power all at the same initial time. Such a spike is or can be very problematic for a power company(ies).

With reference to FIG. 2, a conventional circuit breaker 14 for a residence or commercial building is shown. Such circuit breakers are well known in the art for controlling power and power overloads at various location within a residence or commercial building.

It would be advantageous and desirable to distribute and balance the load consumption by various appliances, devices, and apparatuses at the time of initial power up after a power failure. It would also be advantageous and desirable to distribute the turn-on times of the various appliances, devices, and apparatuses at the initial power up time. It would further be advantageous and desirable to provide circuits for generating and providing various random power-up delay times for the appliances, devices, and apparatuses. It would still further be advantageous and desirable to provide such power-up delay circuits in circuit breakers or within the appliances, devices, and apparatuses themselves.

SUMMARY OF THE INVENTION

It is therefore one object of the present invention to distribute and balance the load and consumption by various appliances, devices, and apparatuses at the time of initial power up after a power failure.

It is another object of the present invention to distribute the turn-on times of the various appliances, devices, and apparatuses at the initial power up time.

It is a further object of the present invention to provide circuits for generating and providing various random power-up delay times for the appliances, devices, and apparatuses.

It is still a further object of the present invention to provide such power-up delay circuits in circuit breakers or within the appliances, devices, and apparatuses themselves.

The foregoing objects are achieved as is now described. The present invention is a load balancing and distributing switch-on/turn-on control for a circuit breaker, an appliance, a device, or an apparatus wherein each switch-on device on a circuit breaker, appliance, device, or apparatus generates and provides a turn-on time delay up to a maximum turn-on time delay so that the turn-on times and respective loads after a power failure from all circuit breakers, appliances, devices, and/or apparatuses are distributed and/or balanced over a turn-on period. The present invention distributes and balances the load and consumption by various appliances, devices, and apparatuses at the time of initial power up after a power failure. The present invention also distributes the turn-on times of the various appliances, devices, and apparatuses at the initial power up time. A circuit system and method for load balancing and distributing switch-on control of an operating device are also disclosed herein. A micro-controller is able to couple to the operating device and to a power-in bus for receiving power from a power source. A relay switch system is coupled to the micro-controller for controlling the power from the power-in bus. The relay switch system is able to couple to a power-out bus to control the power to the operating device. The micro-controller generates a power-up delay time through which the micro-controller must wait and control the relay switch system to hold the power to the power-out bus before the relay switch is released to supply the power to the power-out bus for operation of the operating device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is an algorithm for operating and implementing the present invention turn-on time delay circuit.

DETAILED DESCRIPTION OF ILLUSTRATIVE EMBODIMENT

The present invention is a load balancing and distributing switch-on/turn-on control for a circuit breaker, an appliance, a device, or an apparatus wherein each switch-on device on a circuit breaker, appliance, device, or apparatus generates and provides a turn-on time delay up to a maximum turn-on time delay so that the turn-on times and respective loads after a power failure from all circuit breakers, appliances, devices, and/or apparatuses are distributed and/or balanced over a turn-on period. The present invention distributes and balances the load and consumption by various appliances, devices, and apparatuses at the time of initial power up after a power failure. The present invention also distributes the turn-on times of the various appliances, devices, and apparatuses at the initial power up time. The present invention further provides circuits for generating and providing various random power-up delay times for the appliances, devices, and apparatuses. The present invention still further provides such power-up delay circuits in circuit breakers or within the appliances, devices, and apparatuses themselves.

Figure 1:
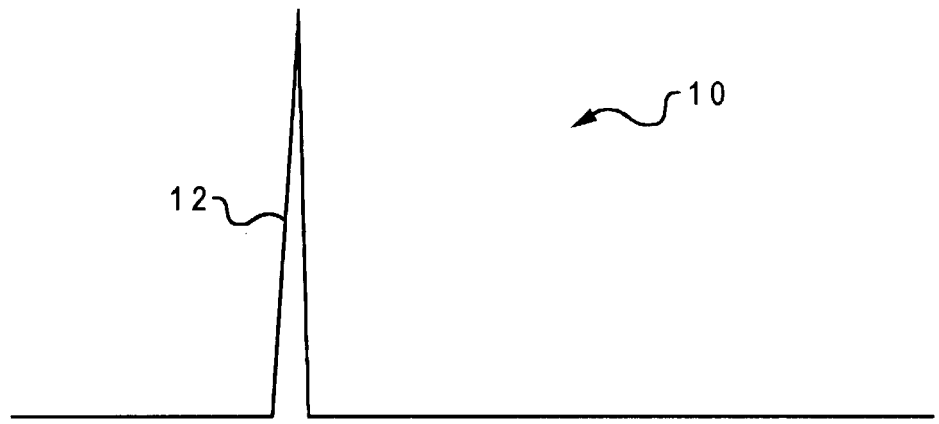
FIG. 1 is prior art timing diagram showing a power load and consumption spike that occurs when power is restored after a power failure.
Figure 2:
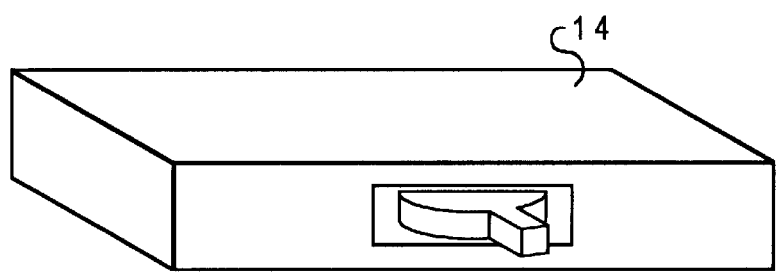
FIG. 2 is a front perspective view of a prior art conventional circuit breaker.
Figure 3:
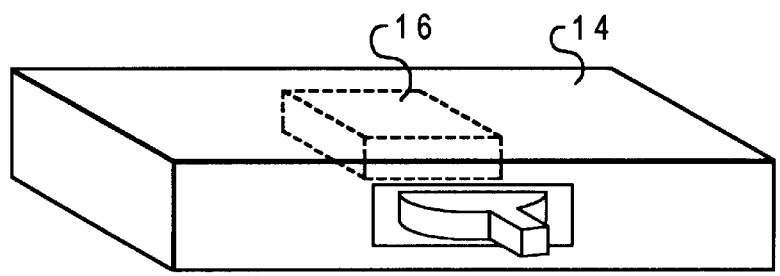
FIG. 3 is a front perspective view of a circuit breaker with the present invention turn-on time delay circuit that generates a random turn-on time delay up to a maximum turn-on time delay.

With reference now to the figures and in particular with reference to FIG. 3, a circuit breaker 14 with the present invention turn-on time delay circuit 16 is shown. The turn-on time delay circuit 16 generates and provides a turn-on time delay up to a maximum turn-on time delay so that the turn-on time and respective load and consumption after a power failure for this circuit breaker 14 is delayed by the generated turn-on time delay. FIG. 3 shows an example of how the present invention turn-on time delay circuit 16 is implemented and used in a circuit breaker 14. The present invention circuit 16, however, is not in any way limited to being used in a circuit breaker, and the present invention circuit 16 may be used and implemented at any suitable location and within any suitable appliance, device, apparatus, etc. The present invention circuit 16 is particularly useful in those appliances, devices, and apparatuses that normally stay on.

Figure 4:
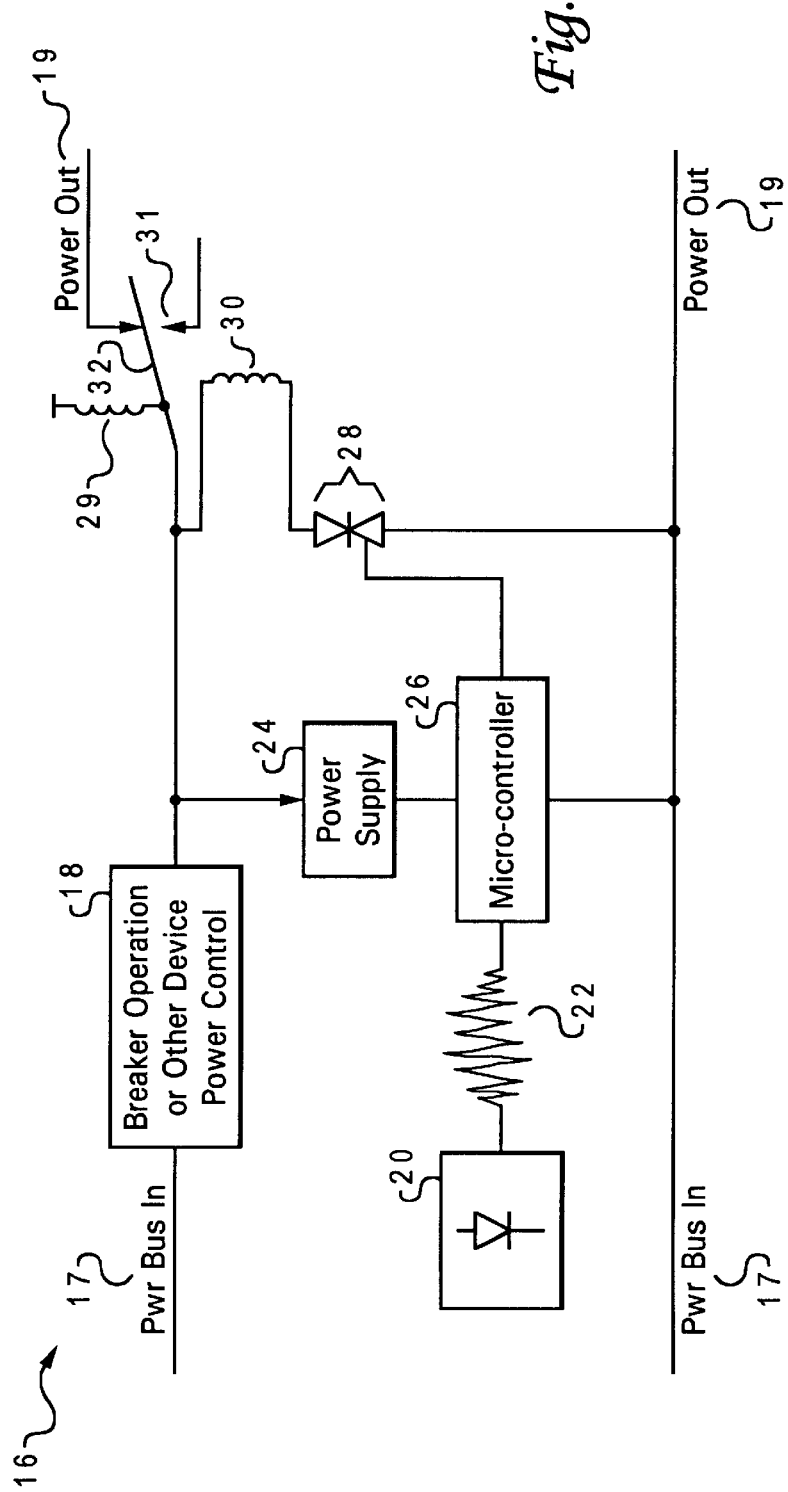
FIG. 4 is a more detailed block diagram of the present invention turn-on time delay circuit.

Referring to FIG. 4, a detailed block diagram of the present invention turn-on time delay circuit 16 is shown. The turn-on time delay circuit 16 shows that power is able to flow in through the power in bus 17 and flow out through the power out bus 19. The normal operations of the circuit breaker 14 or power control of the appliance, device, or apparatus is reflected at block 18. The turn-on time delay circuit 16 controls the initialization of the breaker 14, appliance, device, or apparatus. The turn-on time delay circuit 16 comprises a micro-controller 26 coupled to a noise diode 20 that generates noise 22. The micro-controller 26 is powered by a power supply 24. The micro-controller 26 controls a relay 31 having a relay switch 32 and a switch spring 29 by applying current to a relay coil 30 through a triac 28 or other switching device. When the relay 31 is open (i.e. the switch 32 is held in the down position by current applied to a relay coil 30 through triac 28), the power is held off from being supplied to the power out bus 19. When the relay 31 is closed (i.e. the switch 32 is held in the up position shown by spring 29), the power is allowed to flow out and be supplied to the power out bus 19.

Alternatively, a suitable triac, that is able to close the circuit 16 instead of opening it, is able to be used in place of the combination of the triac and the relay system comprising the relay coil 30, the relay 31, and the switch spring 29. The use of just a triac instead of a triac with a relay system eliminates the initial spike(s) that the relay circuit causes until the relay opens the circuit 16. Also, the present invention and configuration of circuit 16 are not limited to being used with or provided by a triac or a combination triac and relay system, and any other suitable components, devices, and sub-systems may be used. Furthermore, the present invention is not in any way limited to the specific configuration circuit 16, and any suitable components, devices, or sub-systems may be used to provide the present invention.

With reference now to FIG. 5, an algorithm 34 for operating and implementing the present invention turn-on time delay circuit 16 is shown. Referring to FIGS. 4 and 5, the algorithm 34 starts at block 36. The algorithm 34 moves to block 38 where the power in bus 17 is off due to a loss of power or power failure. The algorithm 34 then moves to block 40. At block 40, the power in bus 17 is on due to the fact that the power has been restored and has come back on. The micro-controller 26 is re-booted at block 40.

The algorithm 34 then moves to block 42. At block 42, the micro-controller 26 holds the power out bus off (i.e. output power is off and not supplied) when power is initially restored. The micro-controller 26 opens the relay 31 by holding the switch 32 in the down position and by applying current to the relay coil 30 through the triac 28 or other switching device. The algorithm 34 then moves to block 44. At block 44, the micro-controller 26 samples the noise diode 20 providing the noise 22. The micro-controller 26 samples the noise diode 20 N times to obtain an N bit random number X. For example, the micro-controller 26 samples the noise diode 8 times to obtain an 8 bit random number, such as the 8 bit number "10110011". A power-up delay time is generated based on the random number wherein the power-up time delay time is able to have a maximum value up to $2^N$ times a time unit (e.g. twenty milliseconds, etc.).

The algorithm 34 moves to block 46. At block 46, the micro-controller 26 holds the power out bus 19 off for the generated power-up delay time by counting through the power-up delay time. The algorithm 34 moves to decision block 48. At decision block 48, the algorithm 34 determines whether the micro-controller 26 has counted through the power-up delay time. If it has not counted through the power-up delay time, then the algorithm 34 loops back to block 46 wherein the micro-controller 26 continues to count through the power-up delay time, and the algorithm 34 then continues therefrom. On the other hand, if the micro-controller 26 has counted through the power-up delay time, then the algorithm 34 moves to block 50. At block 50, the micro-controller 26 releases the relay 31, and the switch 32 is closed and sprung back to the up position by the spring 29 wherein power is allowed to be outputted and supplied to the power out bus 19. The algorithm 34 ends at block 52.

Also, the present invention circuit 16 is configured so that the breaker 14, appliance, device, or apparatus that the circuit 16 is coupled to still operates in the normal manner even if a problem exists with circuit 16 or if the circuit 16 is non-operative.

By adding suitable communication input to the micro-controller 26, an external control is able to be applied to the circuit 16 for providing other various types of control of the circuit(s) 16, such as managing power and providing remote emergency shut off.

Figure 6:
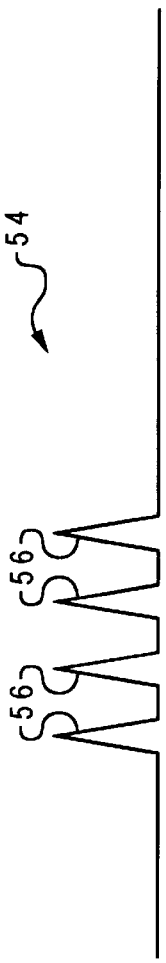
FIG. 6 is a timing diagram showing various power load and consumption spikes during the time when power is restored after a power failure so that the initial power load and consumption is spread over the initial start-up period.

With reference to FIG. 6, there is depicted is a power start up waveform 54 showing various power load and consumption spikes 56 during the time when power is restored after a power failure so that the initial power load and consumption is spread over the initial start-up period.

While the invention has been particularly shown and described with reference to a preferred embodiment, it will be understood by those skilled in the art that various changes in form and detail may be made therein without departing from the spirit and scope of the invention.

What is claimed is:

1. A circuit for load balancing and distributing switch-on control of an operating device, comprising:
   a micro-controller that is able to couple to the operating device and to a power-in bus for receiving power from a power source,
   an electronically controlled switch coupled to the micro-controller for selectably applying power from a power-in bus to a power-out bus that is coupled to the operating device, and
   a noise diode that generates noise which is applied as an input to the micro-controller, wherein the micro-controller:
      samples the noise over a pre-determined time interval to obtain a random number that has a number of bits corresponding to the pre-determined time interval, and
      generates a power-up delay time period based on the random number.

2. The circuit according to claim 1, wherein the electronically controlled switch further comprises:
   a relay switch that is able to couple to the power-out bus and to an off-position,
   a switching device coupled to the relay switch and coupled to and controlled by the micro-controller,
   a relay coil coupled to the switching device, and
   wherein the micro-controller controls the relay switch by controlling a current to the relay coil through the switching device in accordance with said power-up delay time period.

3. The circuit according to claim 2, wherein:
   the relay switch is placed in an open position for holding the power from being supplied to the power-out bus by applying the current to the relay coil through the switching device, and
   the relay switch is placed in a closed position for supplying the power to the power-out bus by no longer applying the current to the relay coil through the witching device.

4. The circuit according to claim 3, further comprising:
   a switch spring coupled to the relay switch that allows the relay switch to automatically spring to the closed position when the current is no longer being applied to the relay coil through the switching device.

5. The circuit according to claim 2, wherein the switching device is a triac.

6. The circuit according to claim 1, wherein the operating device is a device in line with a circuit breaker.

7. The circuit according to claim 1, wherein the operating device is an appliance.

8. The circuit according to claim 1, wherein the power-up delay time period has a maximum value of $2^n$, with n being a number equal to the pre-determined time interval.

9. A method of providing and using a circuit for load balancing and distributing switch-on control of an operating device, comprising the steps of:
   coupling a micro-controller to the operating device and to a power-in bus for receiving power from a power source,
   coupling an electronically controllable switch to the micro-controller for selectably applying power from a power-in bus to a power-out bus that is coupled to the operating device, and
   utilizing a noise diode to generate noise which is applied as an input to the micro-controller, wherein the micro-controller:
      samples the noise over a predetermined time interval to obtain a random number that has a number of bits corresponding to the pre-determined time interval, and
      generates a power-up delay time period based on the random number.

10. The method according to claim 9, wherein the step of coupling an electronically controllable switch further comprises the steps of:
    coupling a relay switch to the power-out bus and to an off-position,
    coupling a switching device to the relay switch and coupled to and controlled by the micro-controller,
    coupling a relay coil to the switching device, and
    using the micro-controller to control the relay switch by controlling a current to the relay coil through the switching device in accordance with said power-up delay time period.

11. The method according to claim 10, wherein the step of using the micro-controller to control the relay switch further comprises the steps of:
    placing the relay switch in an open position for holding the power from being supplied to the power-out bus by applying the current to the relay coil through the switching device, and
    placing the relay switch in a closed position for supplying the power to the power-out bus by no longer applying the current to the relay coil through the switching device.

12. The method according to claim 11, wherein the step of placing the relay switch in a closed position further comprises the step of:
    coupling a switch spring to the relay switch that allows the relay switch to automatically spring to the closed position when the current is no longer being applied to the relay coil through the switching device.

13. The method according to claim 10, wherein the switching device is a triac.

14. The method according to claim 9, wherein the operating device is a device in line with a circuit breaker.

15. The method according to claim 9, wherein the operating device is an appliance.

16. The method according to claim 9, wherein the power-up delay time period has a maximum value of $2^n$, with n being a number equal to the pre-determined time interval.

17. A method of operating a circuit for load balancing and distributing switch-on control of an operating device that has been turned off during a power failure and has been turned back on after recovery from the power failure, comprising the steps of:
    coupling a micro-controller between the operating device and a power source for the operating device,
    coupling an electronically controllable switch to the micro-controller for selectably applying power from the power source to the operating device, and
    utilizing a noise diode to generate noise which is applied as an input to the micro-controller, wherein the micro-controller:
       samples the noise over a pre-determined time interval to obtain a random number that has a number of bits corresponding to the pre-determined time interval, and generates a power-up delay time period based on the random number, wherein said power-up delay is utilized for the selectable application of power from the power source to the operating device.

18. The method according to claim 17, wherein the electronically controllable switch further comprises a relay switch, a relay coil, and a switching device and wherein the method further comprises the steps of:

positioning the relay switch in an open position for preventing the power from being supplied to a power-out bus that couples the power source to said operating device, by applying a current to the relay coil through the switching device, counting, by the micro-controller, through the power-up delay time, determining whether the micro-controller has counted through the power-up delay time, continuing counting, by the micro-controller, through the power-up delay time if the micro-controller has not yet counted through the power-up delay time, and placing the relay switch in a closed position for supplying the power to the power-out bus by no longer applying the current to the relay coil through the switching device if the micro-controller has counted through the power-up delay time.

19. The method according to claim 18, wherein the step of generating the power-up delay time based on a random value further comprises the steps of:

coupling the noise diode to the micro-controller, utilizing the micro-controller to sample noise generated by the noise diode over the pre-determined time interval to obtain the random value having a number of bits corresponding to the pre-determined time interval, and generating, by the micro-controller, the power-up delay time based on a numeric representation of the random value.

20. The method according to claim 17, wherein the power-up delay time period has a maximum value of $2^n$, with n being a number equal to the pre-determined time interval.

21. A circuit breaker having a circuit for load balancing and distributing switch-on control of an operating device, comprising:

circuit breaker components for providing circuit breaker operations, wherein the circuit breaker components are coupled to a power-in bus for receiving power from a power source and a power-out bus for outputting the power therefrom, a micro-controller coupled to the circuit breaker components, a relay switch system coupled to the micro-controller for controlling the power from the power-in bus and coupled to the power-out bus to control the power, and a noise diode that generates noise which is applied as an input to the micro-controller, wherein the micro-controller:

samples the noise over a pre-determined time interval to obtain a random number that has a number of bits corresponding to the pre-determined time interval, and generates a power-up delay time period based on the random number.

22. The circuit breaker according to claim 21, wherein:

the relay switch system further comprises a relay switch, a relay coil, and a switching device, the relay switch in the relay switch system is placed in an open position for holding the power from being supplied to the power-out bus by applying a current to the relay coil through the switching device, and the relay switch is placed in a closed position for supplying the power to the power-out bus by no longer applying the current to the relay coil through the switching device if the micro-controller has counted through the power-up delay time.

* * * * *